Nov. 12, 1968          L. E. FECHTER          3,410,413
     APPARATUS FOR SUPPORTING AND GUIDING A BRIDGE AROUND A
                  CIRCULAR SEDIMENTATION TANK
Filed Dec. 16, 1966                          4 Sheets-Sheet 1

LEONHARD EMIL FECHTER
            INVENTOR.

BY  Alan J. Steger
            Agent

Nov. 12, 1968  L. E. FECHTER  3,410,413
APPARATUS FOR SUPPORTING AND GUIDING A BRIDGE AROUND A
CIRCULAR SEDIMENTATION TANK
Filed Dec. 16, 1966  4 Sheets-Sheet 2

LEONHARD EMIL FECHTER
*INVENTOR.*

BY  Alen J. Steger

Agent

LEONHARD EMIL FECHTER
INVENTOR.

Nov. 12, 1968  L. E. FECHTER  3,410,413
APPARATUS FOR SUPPORTING AND GUIDING A BRIDGE AROUND A
CIRCULAR SEDIMENTATION TANK
Filed Dec. 16, 1966  4 Sheets-Sheet 4

LEONHARD EMIL FECHTER
*INVENTOR.*

BY *Alan J. Steger*
*Agent*

United States Patent Office 3,410,413
Patented Nov. 12, 1968

3,410,413
APPARATUS FOR SUPPORTING AND GUIDING A BRIDGE AROUND A CIRCULAR SEDIMENTATION TANK
Leonhard Emil Fechter, Michelbach, Germany, assignor to Passavant-Werke (near Michelbach, Nassau), Germany, a corporation of Germany
Filed Dec. 16, 1966, Ser. No. 602,318
Claims priority, application Germany, Dec. 17, 1965, P 38,371
9 Claims. (Cl. 210—519)

ABSTRACT OF THE DISCLOSURE

This invention relates to an improved way of mounting a bridge for rotation about a circular sedimentation tank commonly used in the sewerage and waste water treatment industries. The center pier to support and guide the bridge is replaced with a multi-wheeled carriage on the end of each bridge arm which travels on the tank rim to evenly distribute the vertical load and to decrease the horizontal load component on the bridge and tank.

Background of the invention

The present invention relates to scraping devices for use in circular sedimentation tanks, and, more particularly, to the apparatus used for mounting and guiding the scraping devices for rotation in a tank.

A known method of supporting and guiding scraper blades for rotation in a circular sedimentation tank is shown in French Patent, 765,906 (Kaolins). In this patent, a rail is mounted along the top or side of the rim, or both, on which flanged roller wheels, not unlike the wheels on railroad cars, are mounted on a carriage or truck to support the arms which in turn support the scraper blades. A great many trucks are mounted around the rim of the sedimentation tank, each truck rigidly mounted in respect to the truck which immediately precedes and follows it. A drive cable is mounted circumferentially of the tank in frictional engagement with a station at each truck. The trucks, arms, and scrapers are then rotated by means of a drive pulley connected to some suitable power means such as a motor. The drive pulley is rotated so as to intercept the circumferential path of the cable, and is adjustable to vary the tension of the cable.

Another cable driven scraper device is illustrated in German Patent Number 1,165,507 (Von Roll). This apparatus features a rigid ring which is supported and guided along the rim of the tank by rollers mounted on top of the rim. The ring is rotated by a stationary motor mounted outside of the tank. The scraper blades are mounted on arms attached to rotate with the ring. This system has disadvantages primarily due to the one-sided drive which tends to induce radial forces on the ring. In addition, in the case of very thick sediments on the bottom of the tank, the forces on the scraper blades can become so large that the vertical component of the force transferred from the scraper blades to the arms can lift the entire ring and arm assembly off the top of the tank. This means that a sedimentation tank structure of this type has a low capacity in regard to a concentration of the sediments which it can handle.

The Kaolins structure has somewhat the same limitation, but to a lesser extent. However, this has only been partially remedied by providing a great number of supporting trucks on the rails running along the rim of the tank. This type of structure is very complicated and expensive, because of the large number of wheels and rails required. In addition, the friction force between the wheel carriage and cable sometimes became inadequate to overcome the forces required to drive the scraper blades through the sediment. Therefore, this construction also has an upper limit insofar as the concentration of the sediment it can handle.

Summary of the invention

The problems associated with the guidance and load handling capability of the bridge used to support the scraper blades have been obviated with this invention. The design of the structure is such that the loads transmitted from the scraper blades are applied evenly to the walls of the sedimentation tank instead of one side of the tank or to one or a few of the bridge arms.

It is, therefore, a feature of this invention to provide a sedimentation tank wherein no center pier is required for support and guidance of the scraper blade support arms.

Another feature of the invention is the provision of a balanced drive on the bridge whereby the radial forces induced by an unbalanced drive are eliminated.

Still another feature of the invention is the provision of an adjustable pressure guide wheel mounted on the bridge to contact the rim of the tank to resist horizontal forces on the bridge arms and to urge the arms downward into the tank.

Another feature of the invention is the unique design of the bridge arm support carriage which allows it to accurately support and guide the bridge arm about the rim of the tank without using rails or flanged wheels.

In sedimentation tanks of the continuously operating type, the problem has always been how to efficiently collect and discharge the sediment that settles out of the liquid. In circular sedimentation tanks, this has usually been accomplished by rotating a structural bridge above and/or through the liquid in the tank upon which scraper blades are mounted in either a rigidly fixed or elastically yielding manner.

Usually, the bridge is mounted for rotation on a pier in the center of the tank. The bridge arms, then, are those sections which extend radially from the center hub. The scraper blades are arranged on each arm in such a manner that each blade directs the sediment inward towards the next closest blade to the center of the bridge.

In the case of prior mounted bridges, an annular depression or trough was formed around the pier to collect the sediment. A suitable means, such as a pump, then discharged the sediment from the tank.

Somewhat the same procedure was followed for collecting sediment in tanks on which the bridge was mounted on rails mounted circumferentially on the top of the rim.

A problem directly associated with collecting sediment, regardless of how the bridge is mounted in the tank, is that non-uniform forces frequently develop on each arm due to fluctuations in the sediment level on the tank bottom and variations in its density.

The advantage of this invention is that such forces are, first, evenly distributed to not more than three arms of the bridge, and, secondly, utilized by the support and guide wheels on the carriage, or truck, on the end of each arm to load the bridge on the rim of the tank with even more pressure to overcome the resistence.

This characteristic is opposite to that of prior devices in which increased sediment resistance often caused the bridge, arms and scraper blades to rise out of the tank. In this invention, by rigidly supporting the bridge on not more than three arms, load uniformity is achieved; additional support arms, if any, are resiliently loaded to provide guidance and partial support.

The abilitly of this invention to resist upward pressure on the bridge is basically a result of mounting the arms' support and guide wheels on separate, laterally spaced portions of the tank rim. Upward pressure on the bridge induces a reaction couple in each set of support and guide wheels to grip the rim and resist upward and lateral movement.

It is, therefore, an object of this invention to provide an improved bridge guide and support assembly for travel about the rim of a vessel which resists upward and lateral forces with respect to the rim.

Another object of this invention is to provide a guide and support assembly for travel along the rim of a vessel in which the guiding and supporting pressures are variable to compensate for variable loading pressures which might be caused by variable sediment densities.

Still another object of this invention is the provision of a guide and support assembly for a bridge traveling about the rim of a vessel which distributes the load uniformly on said bridge along the rim.

Other objects, features and advantages will become apparent when the preferred embodiments described in the specification are studied in conjunction with the drawings and claims.

*Description of the preferred embodiments*

Figure 1:
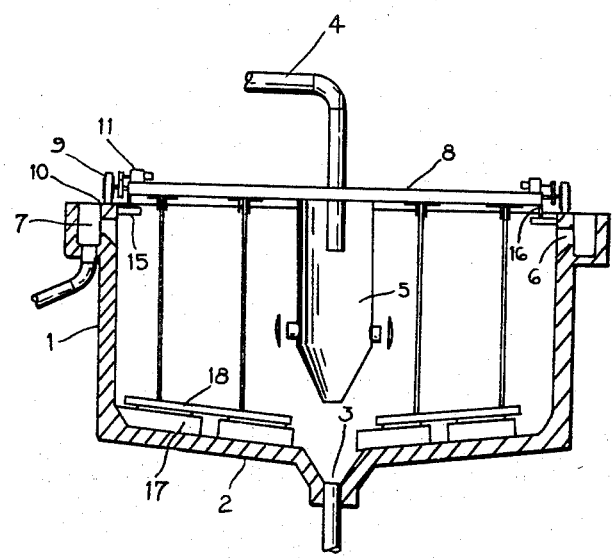
FIGURE 1 is a vertical cross section view of the sedimentation tank, sediment distributor and shows two arms of the bridge with their guide and support wheels.

In FIGURE 1, a circular sedimentation tank 1 is shown with a bottom 2 which slopes slightly towards the center of the tank where a conical sump 3 is located to receive sediment for discharge from the tank.

Sediment containing fluid is brought into the center of the tank through pipe 4 and is distributed uniformly throughout by a distribution device 5. The fluid from which the sediments have been removed is bled off near the top of the tank 1 through openings 6 into an annular trough 7 for discharge.

Figure 2:
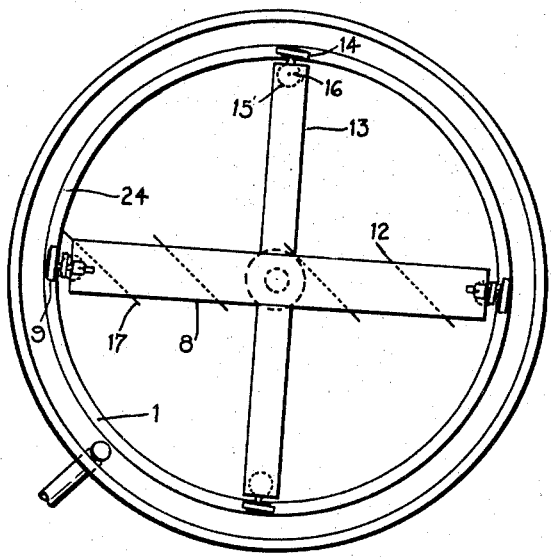
FIGURE 2 is a top plan view of the tank shown in FIGURE 1 which, in addition, shows two support arms with their guide and support wheels.

A bridge 8 is mounted on the rim 10 of the tank 1, across its diameter, with support wheels 9 which rotate about horizontal axes. Support arms 13 are mounted on bridge 8 at right angles to the bridge's arms 12, as shown in FIGURE 2. On the ends of the arms 12 of bridge 8, a gear motor 11 is mounted to drive support wheels 9 and guide wheels 15 through gears mounted on their respective shafts. The guide wheels 15 are mounted on the ends of the arms of bridge 8 to rotate about a vertical axis and are disposed to contact the inner surface of rim 10 to resist horizontal forces on the bridge 8 arms.

In a similar manner, guide wheels 15' are mounted on support arms 13 to rotate about a vertical axis in contact with the inner surface of rim 10 to resist horizontal forces on the arms of bridge 8. The support arms 13 are supported on the rim 10 by support wheels 14 in a manner shown in FIGURE 6, which will be expalined later. The combination of support wheels 14 and guide wheels 15, with their mounting brackets or frames can be said to comprise a carriage when they act together to support and guide the arms of bridge 8.

Of the two arms of bridge 8, and the two support arms 13, only the two support wheels 9 on the arms of bridge 8 are rigidly mounted. The support wheels 14 are resiliently mounted to ensure that the load produced by scraper blades 17 is distributed evenly to the driven support wheels 9 on bridge 8.

The arms of bridge 8 are always symmetrically spaced about the top of rim 10, because only the support wheels 9 on the arms of bridge 8 are ever driven, never the support wheels 14 of support arms 13. This is to ensure that uniform torque is applied to bridge 8 by gear motors 11 to rotate the bridge about the center of the tank 1.

In the embodiment shown in FIGURE 1, bridge 8 has two arms, but a bridge with three equally spaced driven arms could be designed with three complementary support arms 13. The three bridge arms would then be the maximum number that could be guaranteed to contact the rim in the same plane to ensure even distribution of the load on the bridge and rim.

Attached to the arms of bridge 8 are blade arms 18 upon which scraper blades 17 are mounted for rotation with the bridge. The scraper blades 17 are arrayed in a conventional manner so that sediment collected on the bottom periphery of the tank 1 is directed inwardly from blade to blade towards the sump 3. The manner in which the scraper blades 17 are attached to blade arms 18, which in turn are mounted on the arms of bridge 8, can be any of several known methods and will not be detailed here.

Figure 2A:
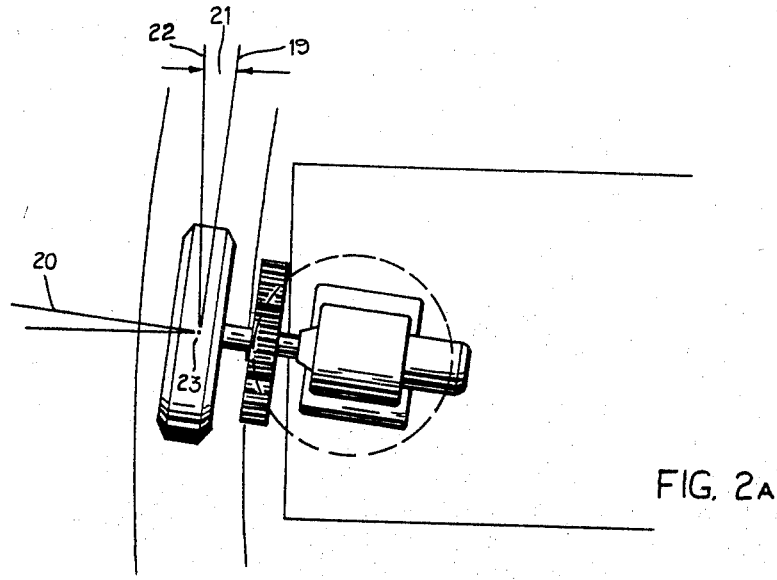
FIGURE 2a is an enlargement of the area around the support and guide wheels shown in FIGURE 2.

To diminish the possibility of axial forces developing along the axis of bridge 8, as shown in FIGURE 2a, the support wheels 9, 14 are canted at an angle 21 inwardly in the horizontal plane toward the center of sedimentation tank 1 in the direction of rotation of bridge 8. This angle 21 is measured between the axis of the bridge 8 across the diameter of the tank and the horizontal axis of rotation 20 of support wheels 9 at the contact 23 of wheel 9 on the circular track 24 of rim 10. Angle 21 is shown in FIGURE 2a as the angle between the tangent 22 and the vertical plane 19 through the point of contact 23 of wheel 9 on rim 10, and it is usually small with values of 1°–2° being found to produce satisfactory results; in all cases, it is selected to follow the curve of the circular tank so that practically no axial forces are generated on the bridge 8.

Figure 3:
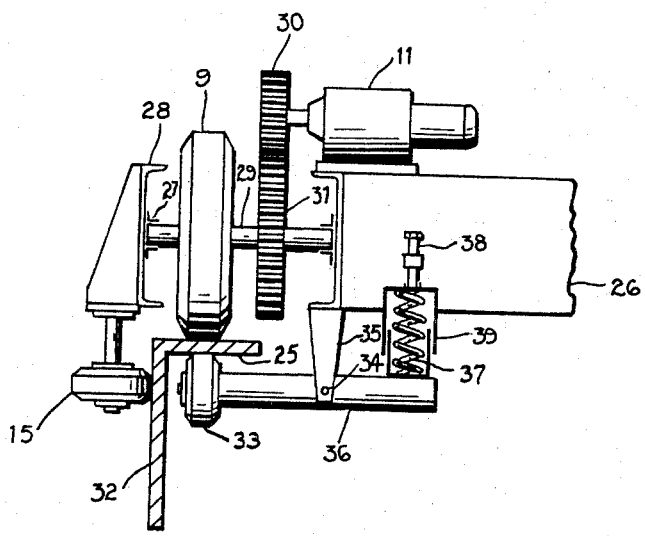
FIGURE 3 shows an alternate design of the carriage or truck assembly used to guide and support the arms of the bridge.

In FIGURE 3, a slightly different method of mounting support and guide wheels 9, 15, respectively, is shown. Support wheel 9 is mounted on the end of scraper bridge 26 to travel on the top rim 25 of the tank wall 32. Outside of the periphery of tank wall 32, frame 28 is mounted on shaft 29 and supported by bearings 27. The guide wheel 15 is mounted on frame 28 to rotate about a vertical axis and is disposed to contact the outer side of wall 32 in supporting engagement.

On the underside of bridge 26, a bearing base 35 is mounted on which lever arm 36 is pivoted around point 34 intermediate of its ends. The longitudinal axes of lever arm 36 and shaft 29 are in the same plane and substantially parallel in normal operating position. A counter roll 33 is mounted to rotate around the longitudinal axis of lever arm 36 and is disposed to contact the bottom surface of rim 25 to run on a path directly below that of support wheel 9. On the other end of lever arm 36, beyond pivot point 34, a spring 37 is positioned against the end of bridge 26 to swing lever arm 36 around point 34 to apply pressure to the rubber tire of counter wheel 36 in its engagement with the bottom of rim 25.

A gear motor 11 is mounted on the top of the end of the arm of bridge 26 so that drive gear 30 drives gear 31 which is keyed to shaft 29 to rotate support wheel 9. The increased pressure supplied by spring 37 to counter wheel 33 increases the pressure, and traction, of the driven support wheel 9 on rim 25. An adjusting screw 38 is provided on spring 37 so that the tractive friction on support wheel 9 can be adjusted. A cup 39 surrounds spring 37 to protect it and act as a stop for lever arm 36.

Figure 3A:
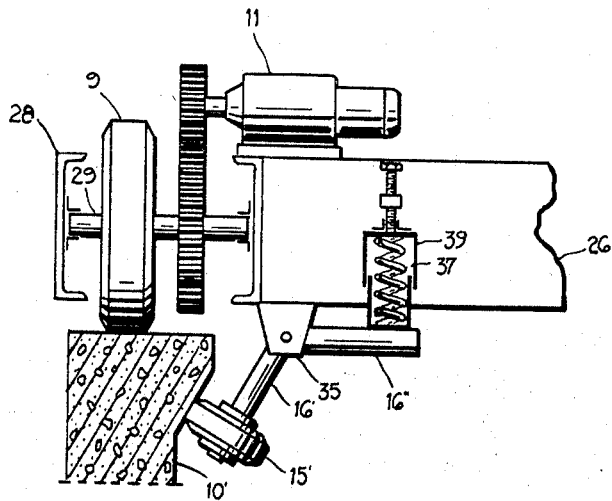
FIGURE 3a shows a variation of the guide and support mechanism illustrated in FIGURE 3.

In FIGURE 3a, a variation of the apparatus in FIGURE 3 is shown. The tank wall is constructed of concrete instead of steel, and the top of the tank's inner wall is slanted outwardly downwardly with respect to the inner wall to form an annular surface 10', which, then, is laterally spaced from the top surface of the rim. Guide wheel 15 and counter wheel 33 of the apparatus shown in FIGURE 3 have been replaced by counter wheel 15' in FIGURE 3a which performs the dual function of guiding bridge 26 and increasing the pressure on support wheel 9 as it travels along annular surface 10'. Counter wheel 15' is mounted to rotate about the inclined portion 16' of lever arm 16" which pivots about pivot point 35. On the other side of pivot point 35 from counter wheel 15' is a spring assembly 37, 39 which applies pressure to counter wheel 15' in the same manner as that described for the apparatus shown in FIGURE 3. Gear motor 11 also drives support wheel 9 in the same manner as described for the apparatus shown in FIGURE 3.

Figure 4:
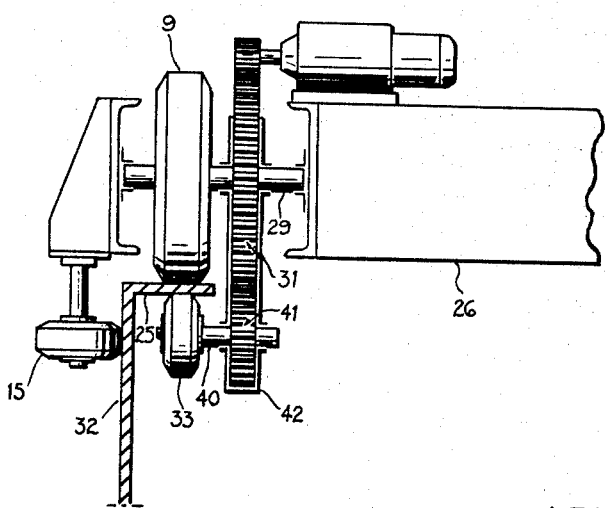
FIGURE 4 shows still another design of the guide and support mechanism in which the guide wheel is driven.
Figure 5:
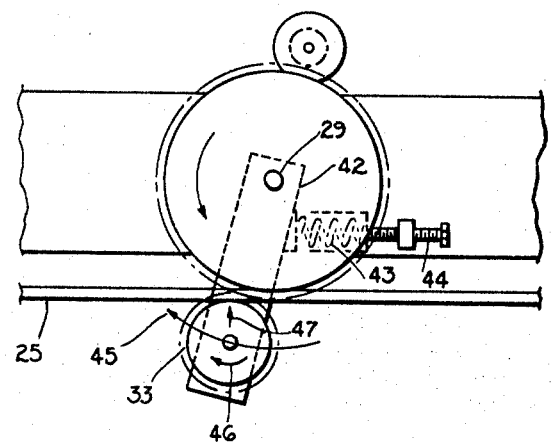
FIGURE 5 is an end view of the apparatus shown in FIGURE 4.

In FIGURES 4 and 5, apparatus is shown in which both the counter wheel 33 and support wheel 9 are driven at the same radial speed. Gear motor 11 drives gear 31, which is keyed to shaft 29 to rotate support wheel 9, and gear 31 in turn drives gear 41 which is keyed to shaft 40 to rotate counter wheel 33. Gear frame 42 is mounted to straddle gears 31, 41 and swings around shaft 29. Counter wheel shaft 40 is mounted on gear frame 42 so that rotation of gear frame 42 also causes counter wheel 33 to rotate.

The support wheel 9 and counter wheel 33 are disposed to contact the upper and lower surfaces, respectively, of horizontal rim 25 of the tank wall 32. The axes of rotation of both counter wheel 33 and support wheel 9 are in a vertical plane, preferably the same one. Guide wheel 15 is mounted from its frame to contact wall 32 in the same manner as above described for the apparatus shown in FIGURE 3.

FIGURE 5 illustrates the manner and direction in which gear frame 42 is rotated forwardly about the axis of shaft 29 in the direction of travel of bridge 26 along rim 25. Mounted on bridge 26 to exert pressure on gear frame 42 is spring 43 whose force is adjustable through adjusting screw 44. The force exerted by spring 43 rotates gear frame 42 about shaft 29 so that the shaft 40 of counter wheel 33 rotates along the path 45 to bring counter wheel 33 forcefully into contact with the bottom surface of rim 25 to apply pressure in the direction 47. Arrow 46 indicates the direction of rotation of counter wheel 33. This arrangement provides lateral and vertical support and guidance of the bridge 26 on rim 25 and wall 32 in addition to the increased traction of having both support wheel 9 and counter wheel 33 driven.

Figure 6:
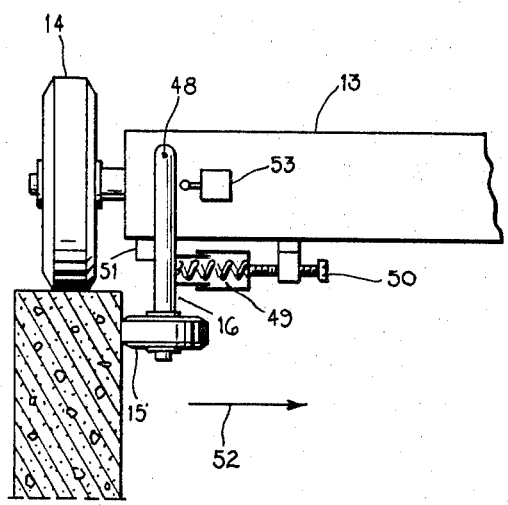
FIGURE 6 shows still another variation of the guide and support wheel mechanism mounted on the bridge support arms such as those shown in FIGURE 2.

FIGURE 6 illustrates equipment in which support wheel 14 is mounted on support arm 13 to travel about the upper rim of a concrete wall. A guide wheel 15' is mounted on shaft 16 which is mounted on support arm 13 to pivot about point 48. In normal operation, shaft 16 is substantially vertical so that guide wheel 15' rotates in a substantially horizontal plane in contact with the inner wall of the tank. A spring 49 loads guide wheel 15' against the tank wall and stop 51. On the inner side of shaft 16 towards the center of the tank, a limit switch 53 is mounted on support arm 13 that is actuated when the horizontal movement of the bridge support arm 13 outward from the center exceeds predetermined limits and the limit switch 53 is brought into contact with shaft 16 as it swings in the direction of arrow 52.

The drive motor 11 is switched off or has its speed reduced when limit switch 53 is activated. The delay in bridge rotation caused thereby provides an opportunity for the spring 49 to relieve overloaded guide wheel 15' and urge it back into normal operating position. The limit switch 53 is then released and drive gear motors 11 resume rotating the bridge.

It has been found that rubber covered support, guide and counter wheels provide better traction on the rim than metal wheels.

It has also been found that if the guide wheel 15' in FIGURE 6 is canted downwardly, in the direction of bridge rotation, at a slight angle so that its plane of rotation is at a small (1°–2°) angle with the horizontal, the downward pressure on support wheel 14 will be increased when guide wheel 15' is urged against the tank wall as the bridge rotates.

Thus it will be seen that an improved bridge mounting for a circular sedimentation tank has been produced which achieves the objectives and advantages set forth. The structures described perform the improved method and avoid disadvantages and obtain an operation heretofore not available. The structures are safe and simple, and sediments have been readily handled which provided resistance forces of up to 250 kp./m. of projected scraper blade length which is 25–30 times the scraper blade resistance of ordinary communal sewage.

The drawings and specification present a detailed disclosure of the preferred embodiments of the invention, but it is to be understood that the invention is not limited to the specific forms disclosed, but covers all alternative constructions and modifications falling within the scope of the principles taught by the inventor. It is specifically understood that the invention's scope is not limited by the Abstract of the Disclosure which is made a part hereof.

I claim:
1. In a circular sedimentation tank having a bottom with a conical surface sloping slightly towards the center where a sump is located for discharging sediment from the tank, and having a side wall extending substantially vertically upward from the periphery of the bottom to end on the top with a flat, horizontal, circular rim;
   a distribution means extending into the center of said tank from the top to distribute sediment uniformly into said tank;
   a bridge with arms extending across the diameter of said tank, which supports said distribution means;
   at least one support arm extending radially through the center of said bridge to substantially near the edge of said rim;
   a support wheel mounted on each end of said bridge and support arm in supporting engagement thereof, said support wheel mounted to rotate about a substantially horizontal axis and disposed to trace a path around said rim so that said bridge can be rotated around the center of said tank;
   drive means operatively connected to each of said support wheels mounted on said bridge ends to rotate said bridge about the center of said tank;
   a guide wheel pivotally mounted on each end of said bridge and on the end of said support arm to rotate about a substantially vertical axis;
   means urging each said guide wheel against the top portion of said vertical wall to resist horizontal forces on said bridge, and to act with said support wheel to produce a force couple on the end of said bridge in resistance to upward movement of said bridge;
   and scraper means attached to the arms of said bridge and which extend into said sedimentation tank to scrape accumulated sediment into said conical sump as said bridge rotates around said tank.

2. Apparatus as set forth in claim 1 wherein:
   said bridge is comprised of up to three arms;
   said bridge arms are evenly spaced with respect to each other in the plane of said rim;

and said support wheel on said support arm is resiliently mounted thereon to aid in resisting the forces on said bridge.

3. Apparatus as set forth in claim 2 wherein:
said support wheels on said bridge and support arm are canted inwardly, in the direction of bridge rotation, towards the center of said circular tank at a slight angle as measured from the plane of rotation of said support wheel and tangent to the outer edge of the rim at the point of its contact with said support wheel.

4. Apparatus for guiding and supporting an object for movement along the rim of a vessel comprising, in combination:
a bridge supporting said object and having arms extending across said vessel;
a support wheel rigidly mounted to each of said bridge arms in supporting engagement therewith, each said support wheel being rotatable along a substantially horizontal axis and disposed to travel about a first upper portion of said rim;
power means operatively connected to at least one of said support wheels to rotate the bridge about the rim;
a counter wheel mounted to each of said bridge arms and disposed to rotate about an axis to contact a second, inner portion of said rim;
said first and second rim portions defining distinctive surfaces spaced laterally on said rim;
resilient spring means to urge each of said counter wheels into contact with the rim to effect horizontal guidance and vertical support of the bridge as it rotates.

5. Apparatus for guiding and supporting an object for movement along the rim of a vessel as set forth in claim 4, further including:
a guide wheel mounted to said bridge for rotation about a substantially vertical axis and disposed to contact a third portion of said rim;
said first, second and third rim portions defining distinct surfaces spaced laterally on said rim.

6. Apparatus for guiding and supporting a bridge for movement along the rim of a vessel, as set forth in claim 5, wherein:
said rim comprises the top of a circular sedimentation tank;
said bridge has a plurality of arms extending across the diameter of said sedimentation tank;
each said support wheel is mounted on the end of each of said arms to support said bridge, and each of said support wheels is canted inwardly in the direction of bridge rotation towards the center of said circular tank at a slight angle as measured from the plane of rotation of each said support wheel and the tangent to the outer edge of the rim at the point of its contact with said each support wheel, thereby avoiding any tendency of the support wheels to run off the rim of said bridge.

7. Apparatus for guiding and supporting a bridge for movement along the rim of a circular sedimentation tank as set forth in claim 6, wherein:
said counter wheel is urged against its corresponding rim surface by an adjustable resilient pressure means cooperable with said resilient spring means to resist horizontal and vertical forces on said bridge.

8. Apparatus for guiding and supporting a bridge for movement along the rim of a vessel as set forth in claim 4, wherein:
each said support wheel and counter wheel is covered with skid resistant material and each said counter wheel is canted downward towards the bottom of said rim at a small angle, in the direction of movement, as measured from the horizontal, thereby increasing the pressure of the support wheel mounted on the same arm to stabilize said bridge.

9. Apparatus as set forth in claim 4, further including:
a switching means operatively connected to said power means to cause said power means to cease operating when said bridge has moved in a radial direction to such an extent that said support wheels are outside of their predetermined track limits on said rim.

References Cited

UNITED STATES PATENTS

| 2,094,552 | 9/1937 | Scott | 210—530 X |
| 2,427,091 | 9/1947 | Durdin | 210—530 |
| 2,427,092 | 9/1947 | Kamp | 210—530 X |
| 2,536,994 | 1/1951 | Cremaschi | 210—530 X |

FOREIGN PATENTS

| 1,197,394 | 7/1965 | Germany. |
| 472,180 | 9/1937 | Great Britain. |
| 1,009,414 | 11/1965 | Great Britain. |

REUBEN FRIEDMAN, *Primary Examiner.*

J. DE CESARE, *Assistant Examiner.*